US006679775B1

United States Patent
Luciano et al.

(10) Patent No.: US 6,679,775 B1
(45) Date of Patent: *Jan. 20, 2004

(54) VOUCHER GAMING SYSTEM

(75) Inventors: Robert A. Luciano, Reno, NV (US); Warren R. White, Reno, NV (US)

(73) Assignee: Sierra Design Group, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/281,929

(22) Filed: Oct. 28, 2002

Related U.S. Application Data

(63) Continuation of application No. 09/420,221, filed on Oct. 16, 1999, now Pat. No. 6,500,067.
(60) Provisional application No. 60/111,062, filed on Dec. 4, 1998.

(51) Int. Cl.[7] .................................................. A63F 9/00
(52) U.S. Cl. .............................. 463/25; 463/16; 463/17; 463/18; 463/19; 463/20
(58) Field of Search ................................ 463/16–20, 25

(56) References Cited

U.S. PATENT DOCUMENTS

| | | | | |
|---|---|---|---|---|
| 4,157,829 A | * | 6/1979 | Goldman et al. | 273/138 A |
| 5,135,224 A | * | 8/1992 | Yamamoto et al. | 273/143 R |
| 5,265,874 A | * | 11/1993 | Dickinson et al. | 273/138 A |
| 5,290,033 A | * | 3/1994 | Bittner et al. | 273/138 A |
| 5,919,091 A | * | 7/1999 | Bell et al. | 463/25 |
| 6,012,832 A | * | 1/2000 | Saunders et al. | 364/410 |
| 6,048,269 A | * | 4/2000 | Burns et al. | 463/25 |
| 6,110,044 A | * | 8/2000 | Stern | 463/29 |
| 6,500,067 B1 | * | 12/2002 | Luciano et al. | 463/25 |

* cited by examiner

*Primary Examiner*—S. Thomas Hughes
*Assistant Examiner*—Carmen D. White
(74) *Attorney, Agent, or Firm*—Russ F. Marsden

(57) ABSTRACT

The system of the present invention provides for cashless transactions in Nevada-style casinos, bingo halls, Amerindian casinos, and the like. The system has a central database running on a server networked to player terminals, cashier's terminals (or stations), and unmanned voucher/cash exchange terminals. Individual transactions are recorded in the database using a unique transition ID where a transaction corresponds to vouchers being inserted into a terminal or vouchers being issued from a terminal. Each transaction stands alone and is recorded separately in the database; there is no logical connection between transactions unlike systems working from a central account. The present invention is particularly robust as it enables terminals to generate unique transaction IDs and print vouchers having a unique transaction ID and player's credits and other information thereon, before confirmation from the central server that the transaction has been stored in the database.

26 Claims, 12 Drawing Sheets

VOUCHER GAMING SYSTEM

RELATED APPLICATIONS

This application in a continuation of application Ser. No. 09/420,221, now U.S. Pat. No. 6,500,067 entitled "Voucher Gaming System" filed on Oct. 16, 1999, which claims priority from provisional application No. 60/111,062, filed on Dec. 4, 1998.

BACKGROUND OF THE INVENTION

Casinos have long demanded cashless transaction systems for their games of chance. The applicants have discovered that, however, gaming players often desire a simple, familiar method of transferring funds in and out of gaming devices without inserting or withdrawing cash at the gaming devices themselves.

Although other prior art systems also have provided the player with the ability to transfer funds from device to device via a printed voucher, they often have required cash funds to be inserted into the gaming devices to initiate game credit deposits. This is unworkable in certain jurisdictions as well as less than optimal for players who prefer not to deal with insertion of funds at the games themselves.

Another problem is that the prior art voucher systems are usually inflexible. For example, they typically do not provide for games of chance in the system to provide awards in one kind (such as by cash or by a particular product) as well as by credit to the player through the voucher system. This deprives the casino using such systems of the ability to generate excitement in the gaming environment, and thus stimulate the desire to engage in further play of the games, by, for example, dispensing actual cash at the games or by providing awards of particular products to the game player.

BRIEF SUMMARY OF THE INVENTION

The applicants have invented a method and apparatus that can be, but need not necessarily be, cashless and does not require the player to insert cash at the gaming device itself. The applicants' method and apparatus prints a unique voucher from one of several different types of terminals on a gaming device network. The cash voucher is accepted by the networked gaming devices (player terminals or PTs) in order to play the games on those networked devices (preferably games of chance). The method and apparatus preferably allows for the issuance of a voucher from a cashier terminal operated by a cashier (CT), an optional mobile cashier terminal (MCT), an optional automated cash exchange terminal (CET), or from a player terminal (PT).

When a voucher is issued, a record of the voucher and its corresponding value are preferably recorded on a database in a separate computer called a player account server (PAS). The voucher preferably may be redeemed for value at a CT or MCT. The voucher may also be used to enable the transfer of credits from the database to a PT, so that a player may elect to play at a different gaming device by generating a voucher on one PT and inserting it into another, without use of cash.

Since the voucher identifies an item in the database, the apparatus and method can also be used, if desired by the casino, for the awarding of non-cash prizes, such as merchandise or other items of value at the CT or MCT or through a networked point of sale system.

As noted above, each voucher preferably has a unique and secure identification indicia printed on it in a machine readable code, preferably in a bar code. The identification can be issued by a random number generator or by a combination of the date, time, machine number, or other number wholly or partially encoded onto the voucher. In the preferred embodiment the value of the voucher is used in the encoding algorithm, but is not included in the bar coded information. This can allow reasonable verification of an amount, but not regeneration of the amount. This security method can also allow a ticket to be validated to a higher level of confidence using information not contained in the machine readable coding.

There are other aspects of the invention that will become apparent as the specification proceeds.

ADVANTAGES OF THE INVENTION

It is an advantage of the present invention that it provides a voucher gaming system and method that are economical and relatively cost effective to implement.

It is another advantage of the present invention that it provides a gaming system and method that allows the use of vouchers rather than cash to play games of chance. This can allow a cashless mechanism that does not require player identification, preregistration, or other inconvenient or expensive media.

Yet another advantage is that the present gaming system and method can provide the option of presenting other forms of award, such as merchandise, entertainment, meals, special game or tournament play credits, or player club points to a player other than cash or cash valued vouchers, such as products or services that may be verified through the networked gaming system, through a networked connection to a point of sale system or other system.

Another advantage of the present invention is that it can be used to issue vouchers representing large jackpot awards that require unique administrative handling, while also leaving remaining player credits on the gaming device, thus permitting continued play and profit for the gaming operator.

A still further advantage of the present invention is that it can provide a fail safe award mechanism that ensures a player will receive a voucher award at the very least in the event of the inability of a gaming machine to dispense another type of award, such as cash, to a player.

An additional advantage of the present invention is that it can provide a system and method that are flexible and adaptable to provide a variety of types of awards under a varying system or use conditions.

Another advantage of the invention is that it allows a method of voucher redemption by a cashier under conditions where certain network or database elements not fully operational.

Another advantage of the invention is that it provides for a dual mode of operation, whereby the same hardware can function as a player terminal or as a cash exchange terminal, with an optional manual operation by a player required to change the operating mode.

Yet another advantage of the invention is that it allows for a cashier terminal to be mobile using a radio link for connection to the other elements of the system.

Still yet another advantage of the invention is that it allows a dual mode of prize payout, whereby a given prize can be issued from a gaming device in a voucher or cash form. This can be initiated by player selection or by one of several circumstances, such as when a coin or coupon payout hopper is empty or a malfunction of one or more other devices interferes with the payout taking place.

There are other advantages of the invention. They will become apparent as the specification proceeds. In this regard, it is to be understood that, with regard to the above-noted Brief Summary of the Invention and Advantages of the Invention, the scope of the invention is to be determined by reference to the accompanying claims and not necessarily by whether the subject matter fulfills all aspects of the Brief Summary or Advantages stated above.

BRIEF DESCRIPTION OF THE DRAWINGS

The preferred embodiment of the present invention are shown in the accompanying drawings, wherein.

DETAILED DESCRIPTION OF THE PREFERRED EMBODIMENT

Figure 1:
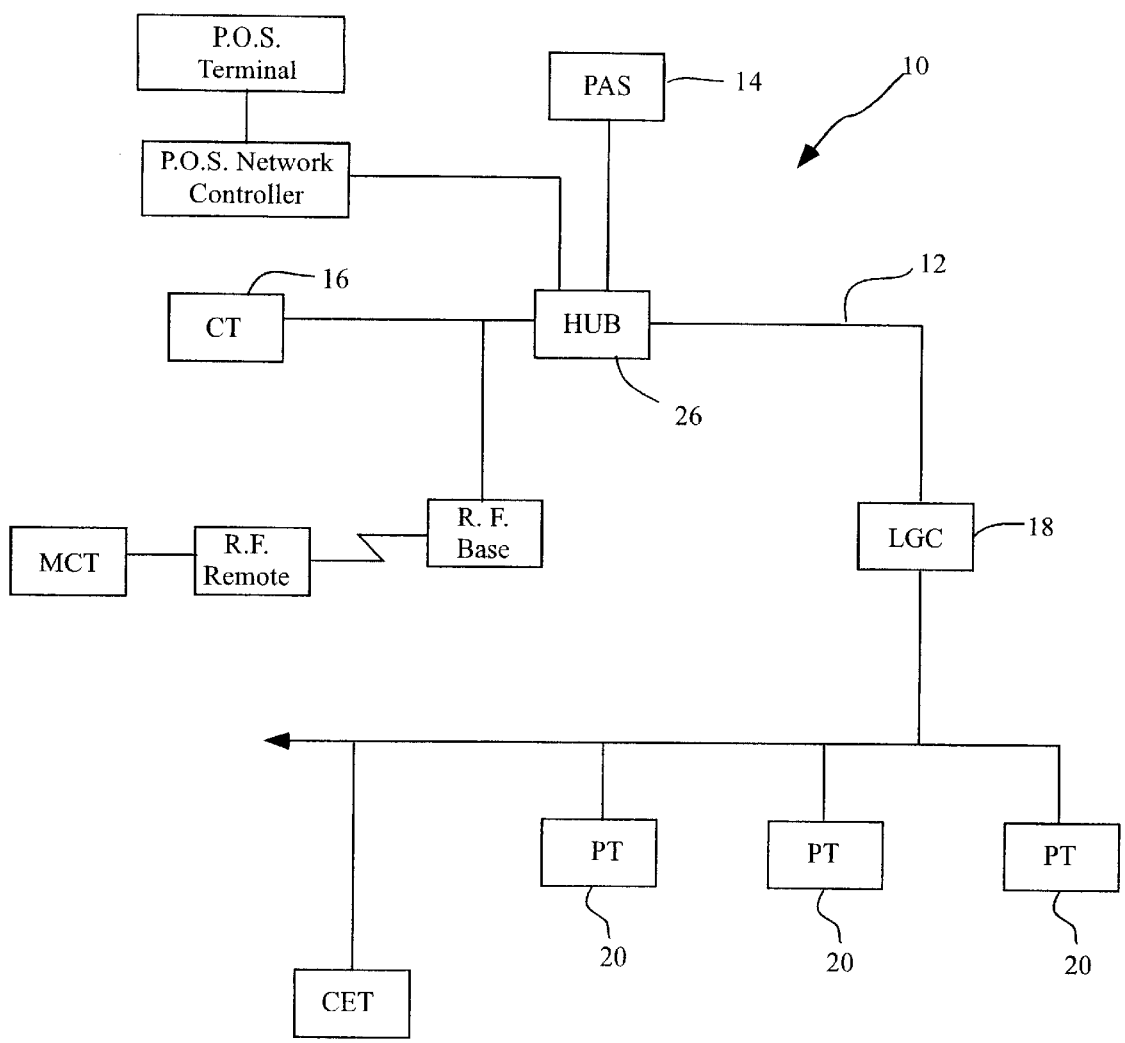
FIG. 1 is a schematic drawing of the basic components of the applicants' preferred gaming system.

Referring now to FIG. 1, the applicants' preferred embodiment, generally 10, includes a network 12, which may be a conventional Ethernet LAN, interconnecting a Player Account Server ("PAS") 14, one or more cashier terminals ("CT"), optional mobile cashier terminals ("MCT") 17 connected by a radio ("R.F.") link 15, optional Point Of Sale Network Controller ("POSNC") connected to a Point of Sale Terminal ("POST") 11, one or more logical game controllers ("LGC") 18, one or more cash exchange terminals 25, and a plurality of player terminals ("PT") 20, 22, 24. The PAS may consist of a COMPAQ 1850R database server using the Windows NT operating system and the Microsoft SQL 7.0 database software. The POSNC 11 and the POST 19 may consist of computer components and software available from companies such as MICROS Technologies. An Ethernet hub or switch ("HUB") 26, such as a 3COM model 3300, on the LAN 12 connects directly with the PAS 14, CT 16, MCT through the radio link (Aironet) 15, and LGC 18; and in turn the LGC 18 connects the plurality of securely packaged PTs 20, 22, 24, and CET 25 into the LAN in a fashion well known to those skilled in the art using Ethernet or RS485 connection techniques.

Figure 2:
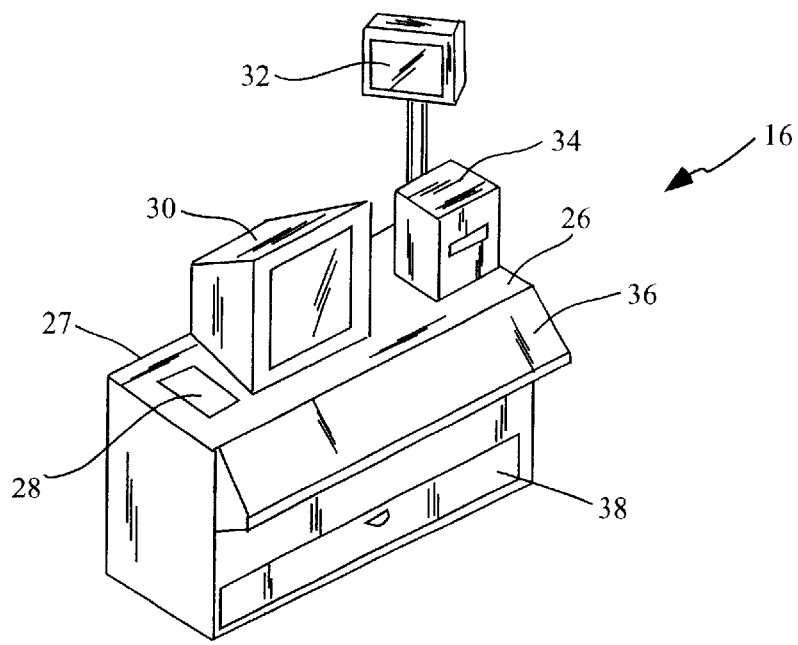
FIG. 2 is a pictorial view of one embodiment of a cashier terminal ("CT") usable in the present system and method.

Referring now to FIG. 2, one embodiment of the CT has a central computer 26. Mounted on the central computer 26 are conventional Ethernet input and output ports (not shown) 27, a bar code reader 28 (Metrologic model MS6720), a base video display (Miracle M0935) 30, an eye level tower display 32 (Logic Controls), a ticket printer 34 (Transact Technology, of Wallingford, Conn., Series 700 Thermal Printer), standard PC keyboard and RS232 controlled industry standard point of sale cash and voucher drawer 38.

Figure 4:
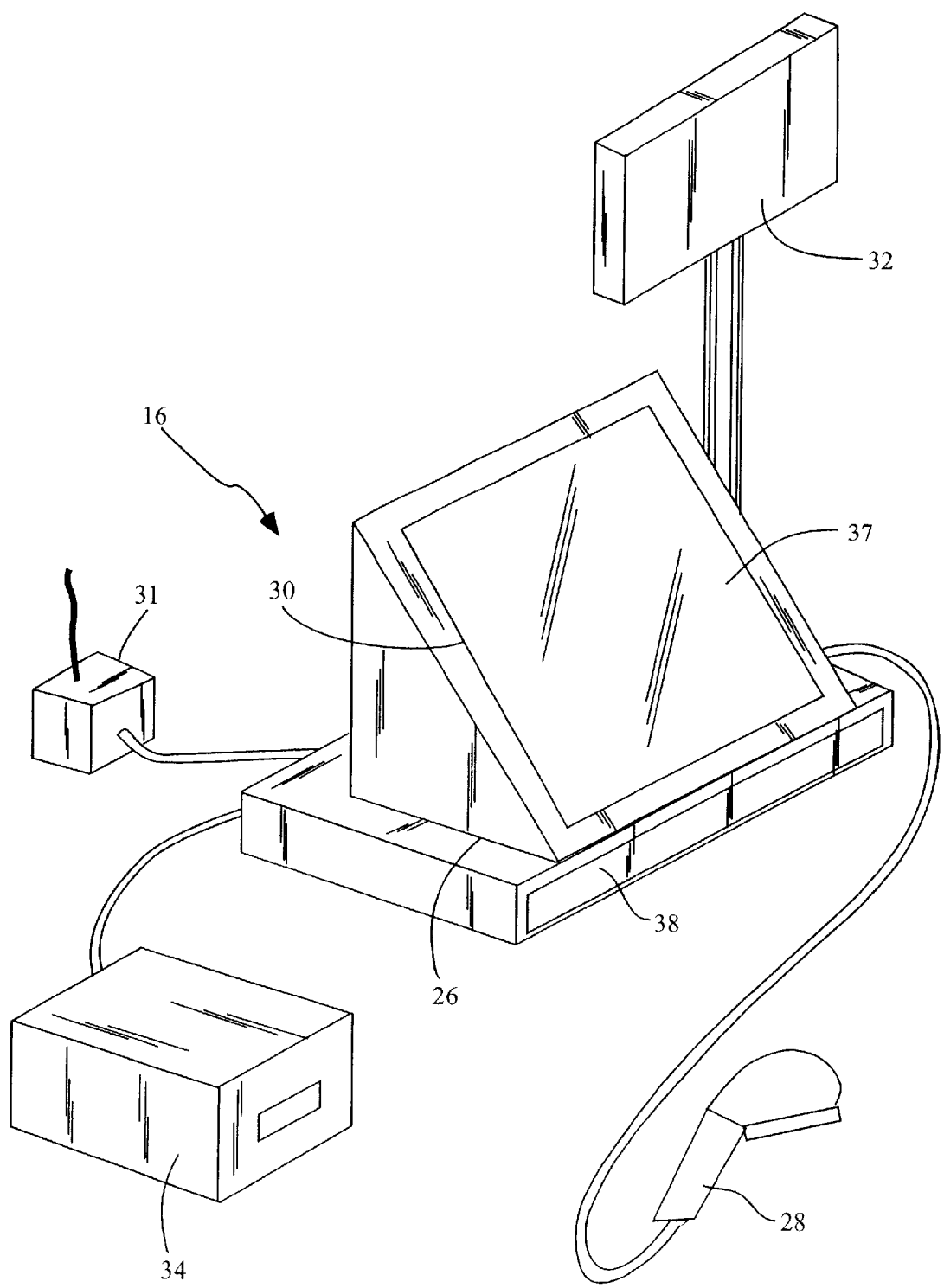
FIG. 4 is a pictorial view of a second embodiment of an alternative embodiment of a cashier terminal ("CT") usable in the present system and method.

Referring now to FIG. 4, an alternative embodiment of the CT 16 has a central computer 26 consisting of a Javelin model JAV-LGNPW D32 WIN with integral customer display 32, video display 30, and touch screen 37. Mounted on the central computer 26 are conventional Ethernet ports (not shown) 27, optionally, for the MCT, a radio transmitter/receiver (Aironet), a hand held bar code reader 28 (Metrologic Model MS6720), ticket printer 34 (Transact Technology Series 700 Thermal Printer), audit printer 35 (Epsom TM-U200PD Model 119D), and a cash and voucher drawer 38.

Figure 3:
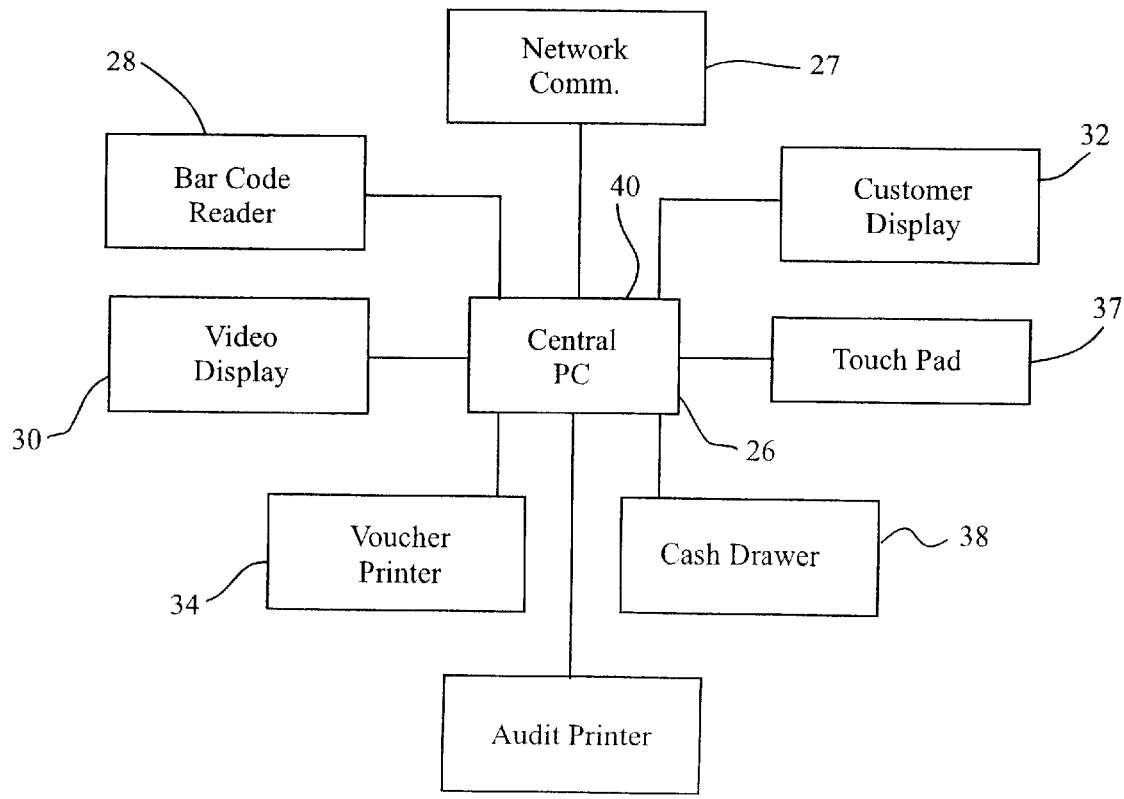
FIG. 3 is a schematic drawing of the internal components of the applicants' preferred CT.

As shown in FIG. 3, the CT central computer 26 for the CT 16 shown in FIG. 4 consists essentially of a PC running the Windows NT or Windows 95 or 98 operating system. The central computer 26 has a standard PC motherboard 40 connected to and supporting the operation of the bar code reader 28, the table video display 30, the tower or customer display 32, the audit printer 35, the voucher printer 34, the touchpad 37, the drawer 38, and the network comm ports 27. The construction of the CT16, in conformance with this specification, is well known to those skilled in the art.

Figure 5:
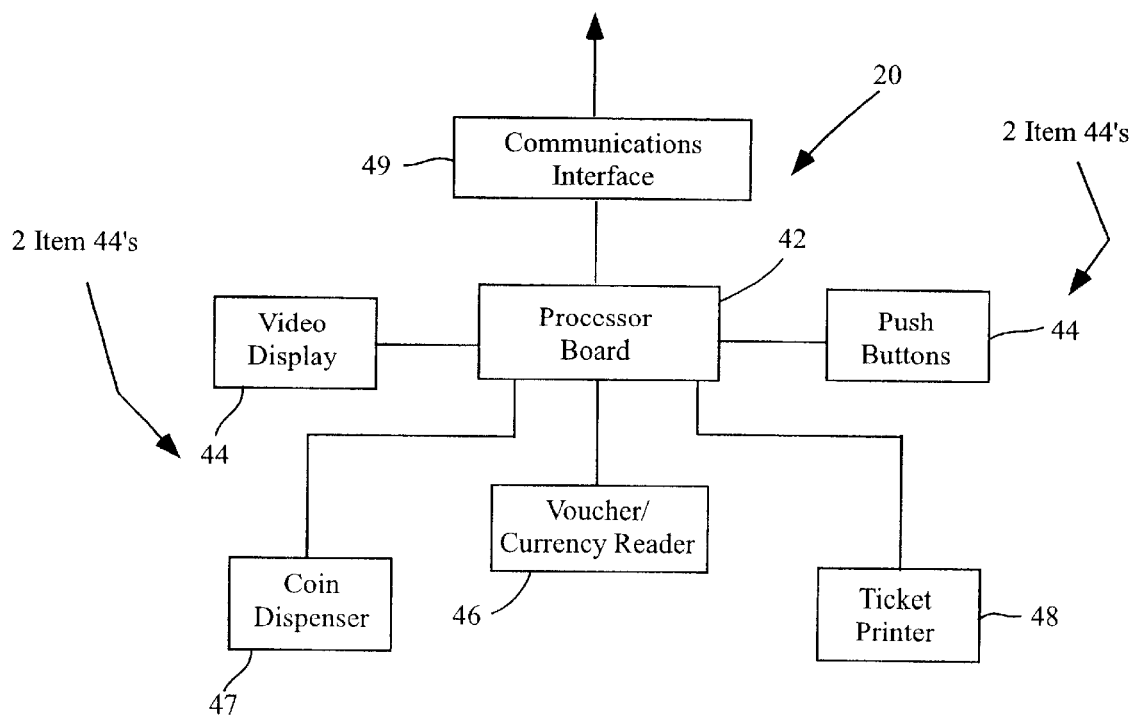
FIG. 5 is a schematic drawing of the internal components of the preferred gaming device ("PT") and of the cash exchange terminal ("CET")

With reference now to FIG. 5, the applicants' preferred player terminal PT 20 includes a central PC or equivalent motherboard 42 connected to and supporting a visual display (Telco high resolution 19 inch) 44, push or game buttons 45, a combination voucher and currency reader (JCM WBA 13SS) 46, conventional gaming network LAN input/output ports or communication interface 49, and ticket printer (Transact Technology Series 700 Thermal Printer) 43. Optionally, the PT 20 may include a coin dispenser (Akahi-Seiko) 47 in order to dispense cash awards. The construction of the PT 20 in conjunction with this specification is well known to those skilled in the art.

Figure 6:
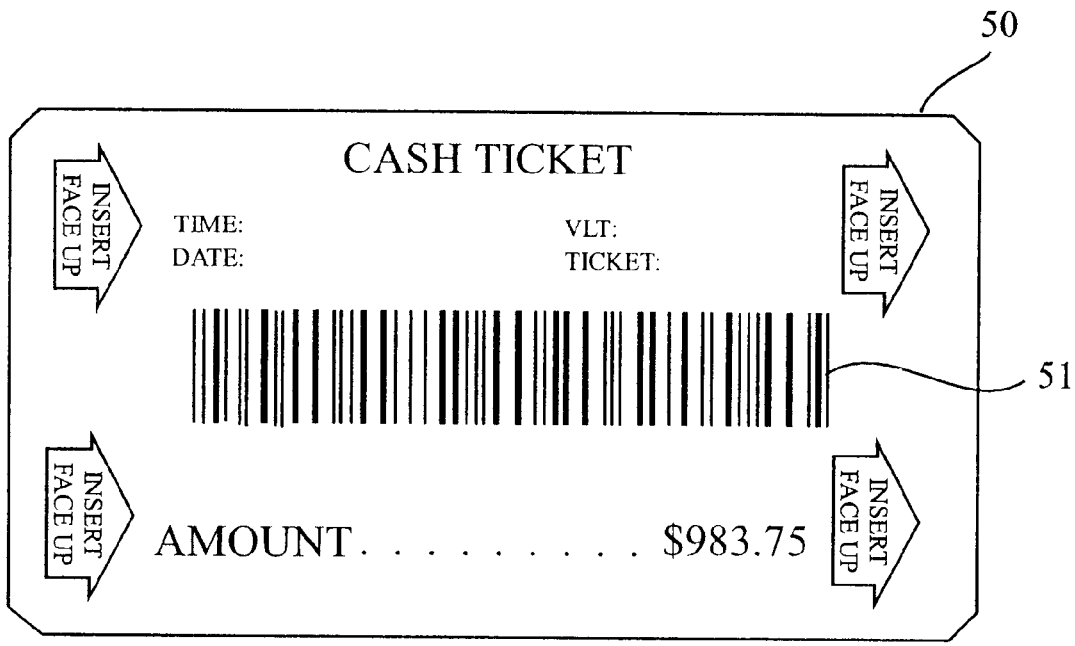
FIG. 6 is a plan view of the preferred type of voucher generated by a CT, MCT, CET, or PT in the applicants' preferred system.

Referring now to FIGS. 2 and 4, the voucher printer 34 on the CT 16 prints, as shown in FIG. 6, a paper voucher 50. Preferably, a similar type of voucher 50 can be printed by the ticket printer 34 as shown in FIGS. 2 and 4.

Preferably, the voucher 50 reports the date and time that the voucher or ticket 50 was issued. It also identifies the issuing device CT, MCT, CET, or PT ("VLT") that issued the ticket, and a ticket number. The ticket 50 also states an amount or face value of the ticket 50 when issued by the CT, MCT, CET, or PT as applicable. Finally, the ticket 50 also includes a bar code 51 that has a variety of fields representing the above noted data stated on the face of the ticket 50.

The bar code 51 also imbeds an encoded value, which is derived as a function of the information on the ticket, including the amount. Since this field is compressed, the algorithm does not allow for the reverse calculation. This value can also be used to confirm that a ticket is being redeemed for the correct amount, because the algorithm can be recalculated and checked. Such algorithms are well known to those skilled in the art; and the applicants believe that a wide number of such techniques may be utilized equally well. The ticket 50, thus contains information to provide for checking the authenticity of the ticket 50 as it is being used by the player in the present system. This also provides a mechanism whereby a ticket may be validated for redemption, even when access to the database is denied through network or other failure.

Figure 7:
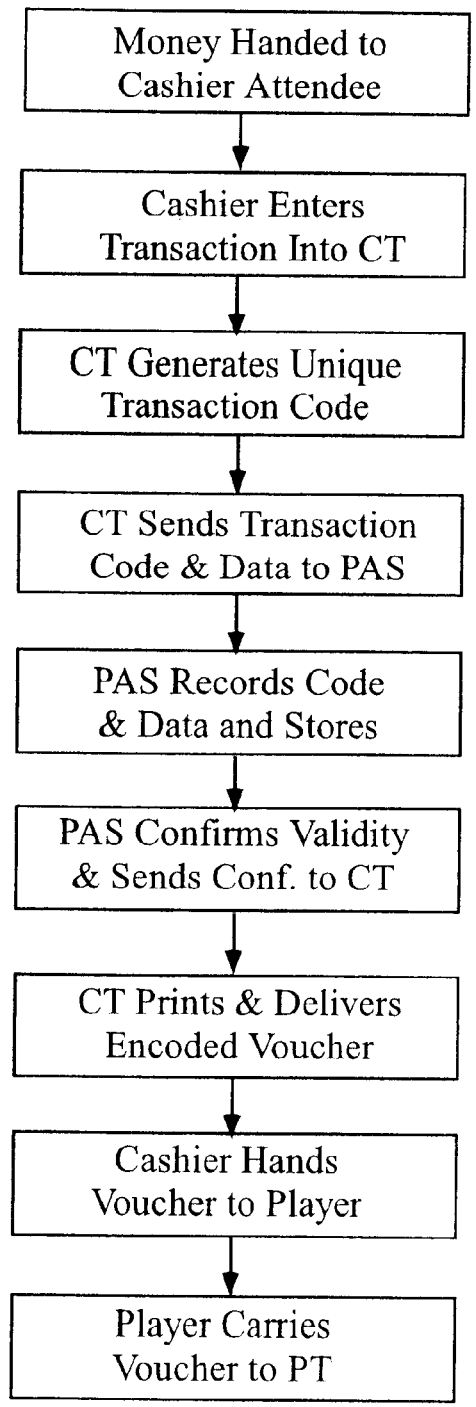
FIG. 7 is a flow chart of the applicants' preferred method of using a voucher at a CT or MCT to transfer credits from the database to a game of chance in the applicants' preferred system.

With reference now to FIG. 7, a player initiates play in the present system and method usually by handing cash (or other form of remuneration or credit) to a cashier attending a CT or MCT. The cashier enters the transaction into the CT through the keyboard, and the CT generates a unique transaction code to be printed on a voucher as noted above in connection with the discussion of FIG. 6. The CT then transmits the calculated transaction code and associated data (the time, date, amount tendered by the player) to the PAS. The PAS checks the validity of the information received from the CT, records the transaction code, amount of the voucher value and identifying data, and stores the information in the database. The PAS then transmits to the CT a confirmation of the validity of the code and stores all the information in a database record to be accessed by the unique transaction code. Upon receiving the confirmation the CT prints the voucher, such as shown in FIG. 6. The cashier then hands the voucher to the player so that the player may take the voucher to commence playing games of chance on any one of the PTs on the network, as shown in FIG. 1.

Figure 8:
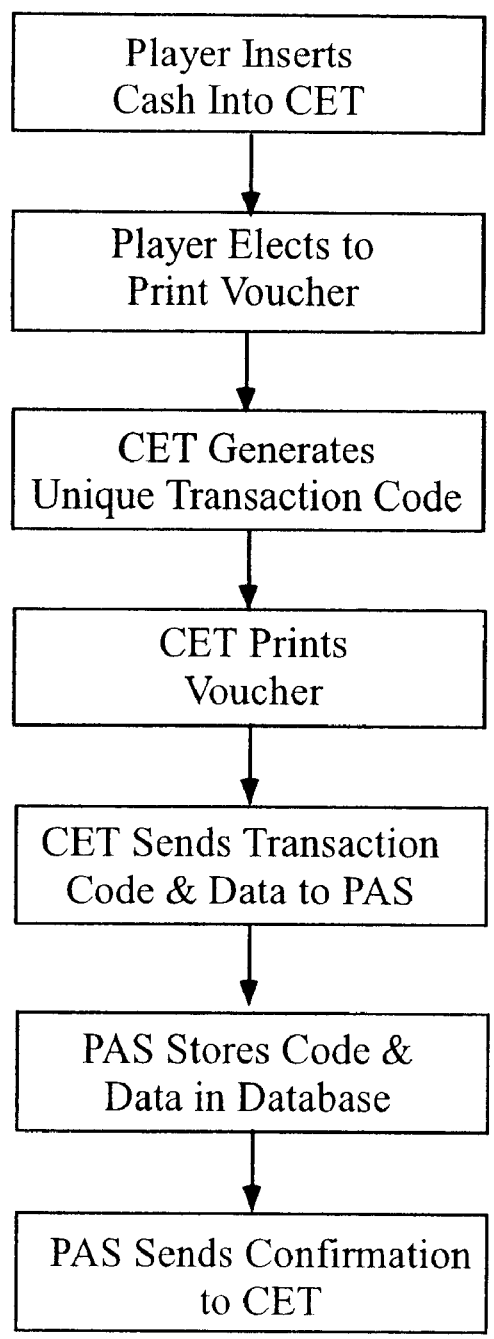
FIG. 8 is a flow chart of the applicants' preferred method of using a voucher at a PT to transfer credits from the database to a game of chance in the applicants' preferred system.

With reference now to FIG. 8, a player may initiate play in the system by inserting cash into a CET. Multiple bills can be inserted until the player elects to print a voucher by pressing a button or touching a designated area on the CET touch screen. The CET prints a voucher of the type shown in FIG. 5. The CET transmits to the PAS a record of the unique transaction number, the value of the voucher, the date and time of issue, and the identity of the CET. The PAS will record this information in the database and confirm the completion of the transaction to the CET.

With the addition of a mode switch on a PT, a PT can be used to perform the function of a CET. That is, PT can accept cash and print tickets when in CET mode, and then, when placed into a PT mode by depressing a mode button, accept vouchers, issue vouchers, and conduct games of chance and provide awards as further provided herein for PT's elsewhere.

Figure 9:
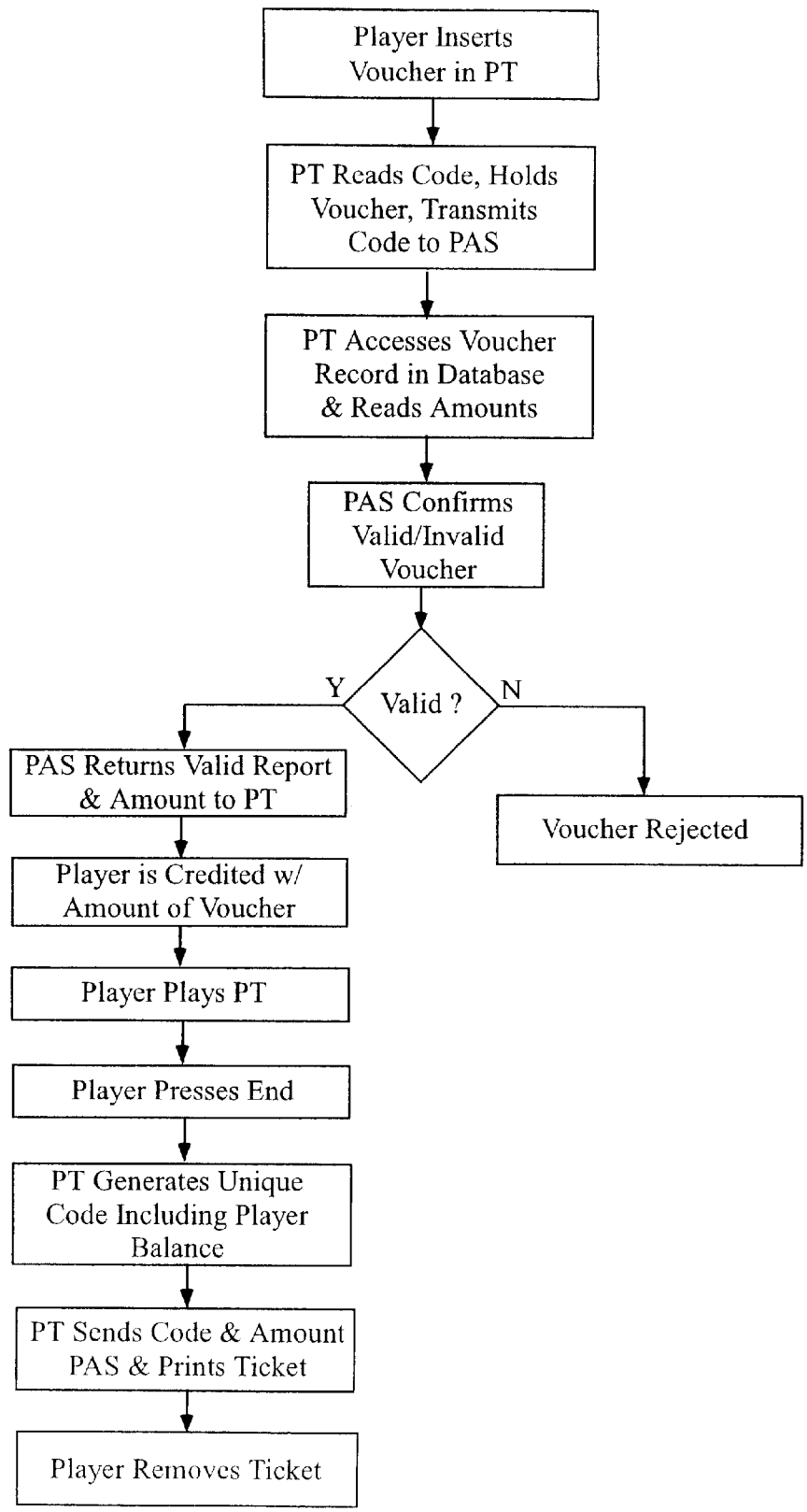
FIG. 9 is a flow chart of the applicants' preferred method of using a voucher to transfer credits from the database to a game of chance in the applicants' preferred system.

Referring now to FIG. 9 a player may transfer credit from the database to a PT in order to play a game of chance on the PT. The player inserts a voucher into the voucher receptacle in the voucher/currency acceptor. The PT reads the voucher's bar code (51 in FIG. 6) and verifies an error free read. The PT then retains the voucher temporarily in an escrow position and sends the voucher's bar code to the PT's processor, which forwards it to the PAS. The PAS uses the transaction code to access the database record maintained by the database on the PAS. PAS then confirms the encoded information within the bar code against the related information maintained in the PAS database and thus confirms that the ticket is valid. PAS then returns the voucher amount from the PAS database to the PT and updates the status of the applicable PAS database record to indicate that the voucher has been paid.

If PAS reports that the voucher is invalid, the voucher is not accepted and is backed out of the escrow position in the voucher reader assembly and returned to the player. If, on the other hand the voucher is valid, the PT stacks the voucher internally and credits the player with the amount from the associated PAS database record. The player may then use the credited amount to initiate games of chance on the PT.

Figure 10:
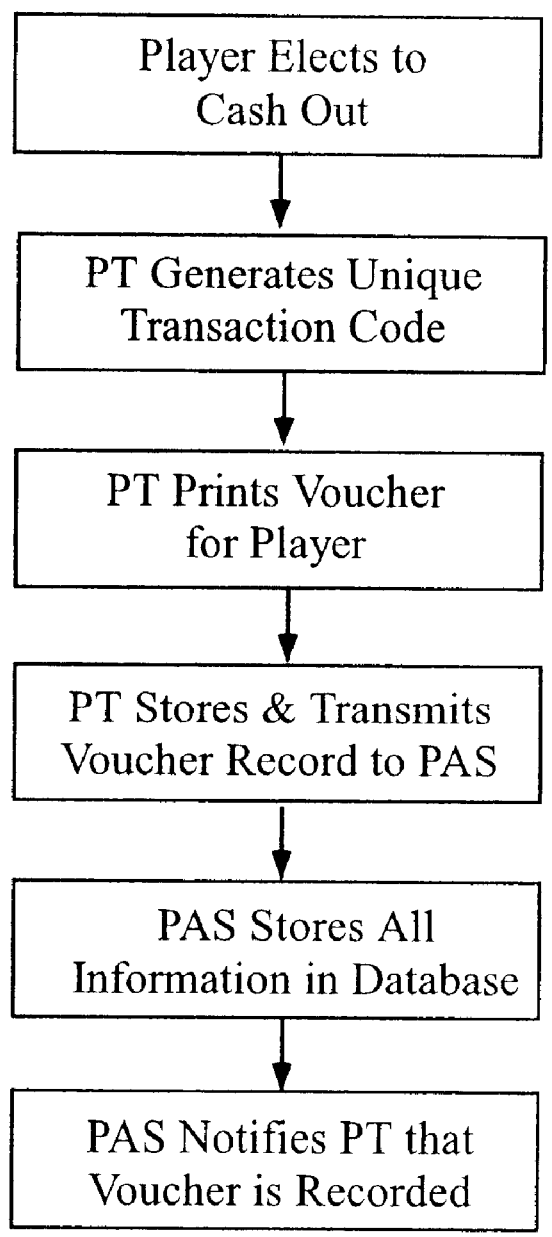
FIG. 10 is a flow chart of the applicants' preferred method of using a voucher to cash out at a given gaming terminal ("PT") in the preferred system and method.

With reference now to FIG. 10, when the player decides to terminate play on the PT, the player presses a button or touch screen area on the PT, which terminates play on the PT during an idle period, as is well understood by those skilled in the art. The PT then prints a new, second voucher and ejects it toward the player. This second voucher is also of the type generally shown in FIG. 6. With continuing reference to FIG. 10, this second voucher includes an associated second balance for the player and second transaction code, based on the same type of data and encoding techniques described above for the first voucher issued to the player at the CT. The PT also reports this second code and associated data (credit balance for the player, date, time, and PT number) to the PAS, and the PAS confirms the data and updates the database record. The PAS then notifies the player's PT that the new, second voucher has been recorded in the PAS database.

Figure 11:
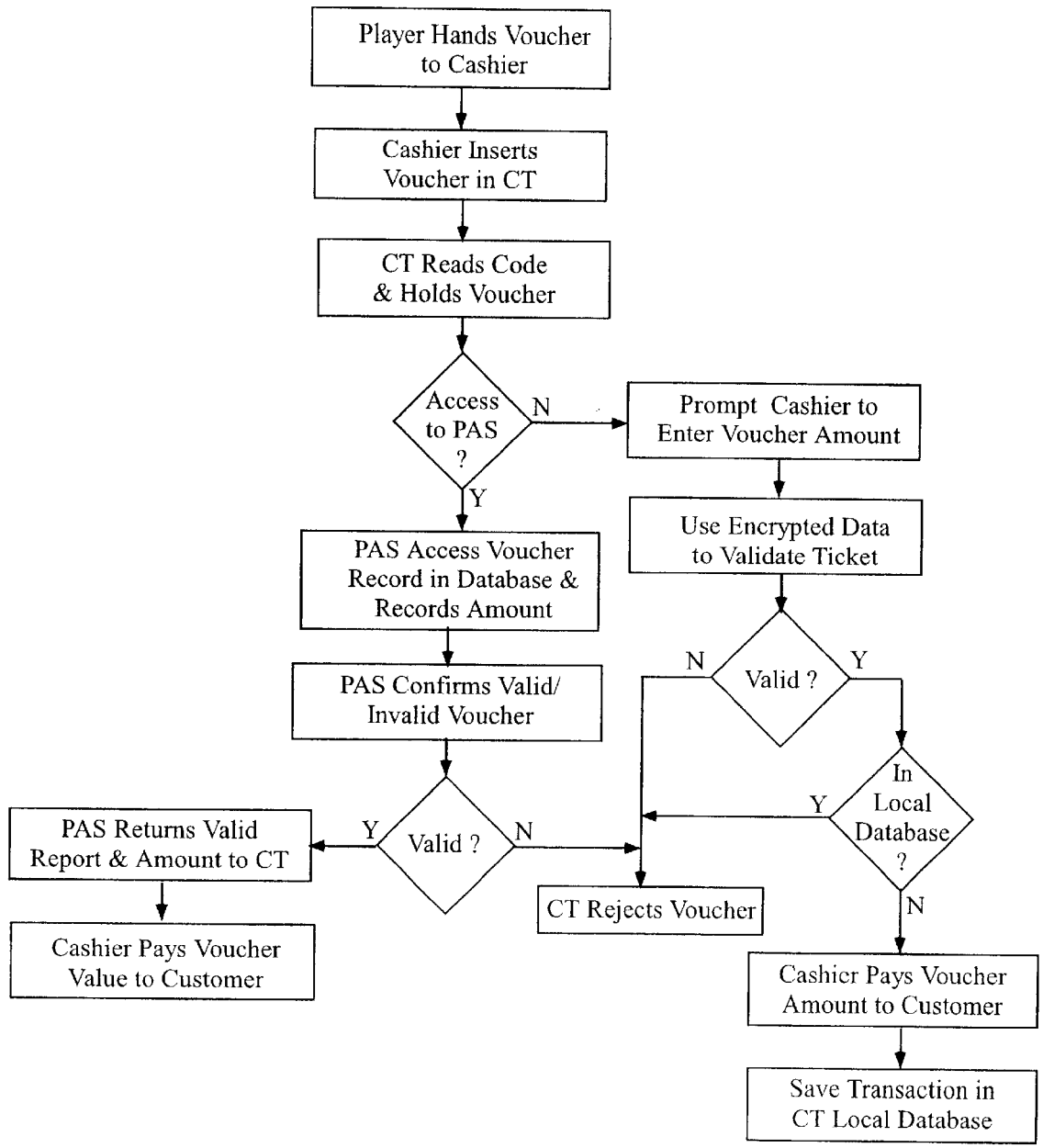
FIG. 11 is a flow chart of the applicants' preferred method of turning in a voucher to a cashier at a CT or MCT for the redemption of cash or prizes in the applicants' preferred system.

With reference now to FIG. 11, the player may redeem the second voucher at the CT. In doing so, the player hands the second voucher to the cashier at the CT, and the cashier scans the bar code on the second voucher with the bar code reader on the CT. The bar code reader interprets the bar code, and the CT then reads the bar code, including its encoded information and other associated data as noted above. The CT then sends this transaction code and associated data to the PAS, and the PAS checks validity of the code and data against the contents of the record for the transaction code in the PAS database and returns a status (and value of the voucher, if any) to the CT. If the PAS reports that the data is invalid, the CT rejects the voucher and reports the rejection on the CT table display. If the PAS reports that the data is valid, the CT reports the amount of the credit due the player on the CT table display, and the cashier pays the player.

Even under conditions of partial failure, applicants have discovered that it is highly desirable to be able to pay a player an amount due. Accordingly, the method allows validation, even if access to the PAS is not possible by a CT or MCT, due to network or other malfunction. In that case, the CT or MCT locally validate the payment, retain a record of the transaction, and forwarding a record of the transaction to the PAS at a later time. In order to accomplish the task, the CT or MCT, after reading the bar code, prompt the cashier to enter the face amount of the voucher through a manual entry. The CT or MCT then perform two checks. First, the CT or MCT verify that the encoded information is consistent with all data on the bar code and the amount, and then CT or MCT verify that the machine (CT or MCT as applicable) does not already have the particular ticket or voucher in the machine's local database (which would, if already in the local database, indicate that the particular voucher or ticket has already been cashed). If neither is true then the cashier is prompted to pay the customer, and the voucher record is retained in the local database of the CT or MCT, as applicable, for later transmission to the PAS.

Figure 12:
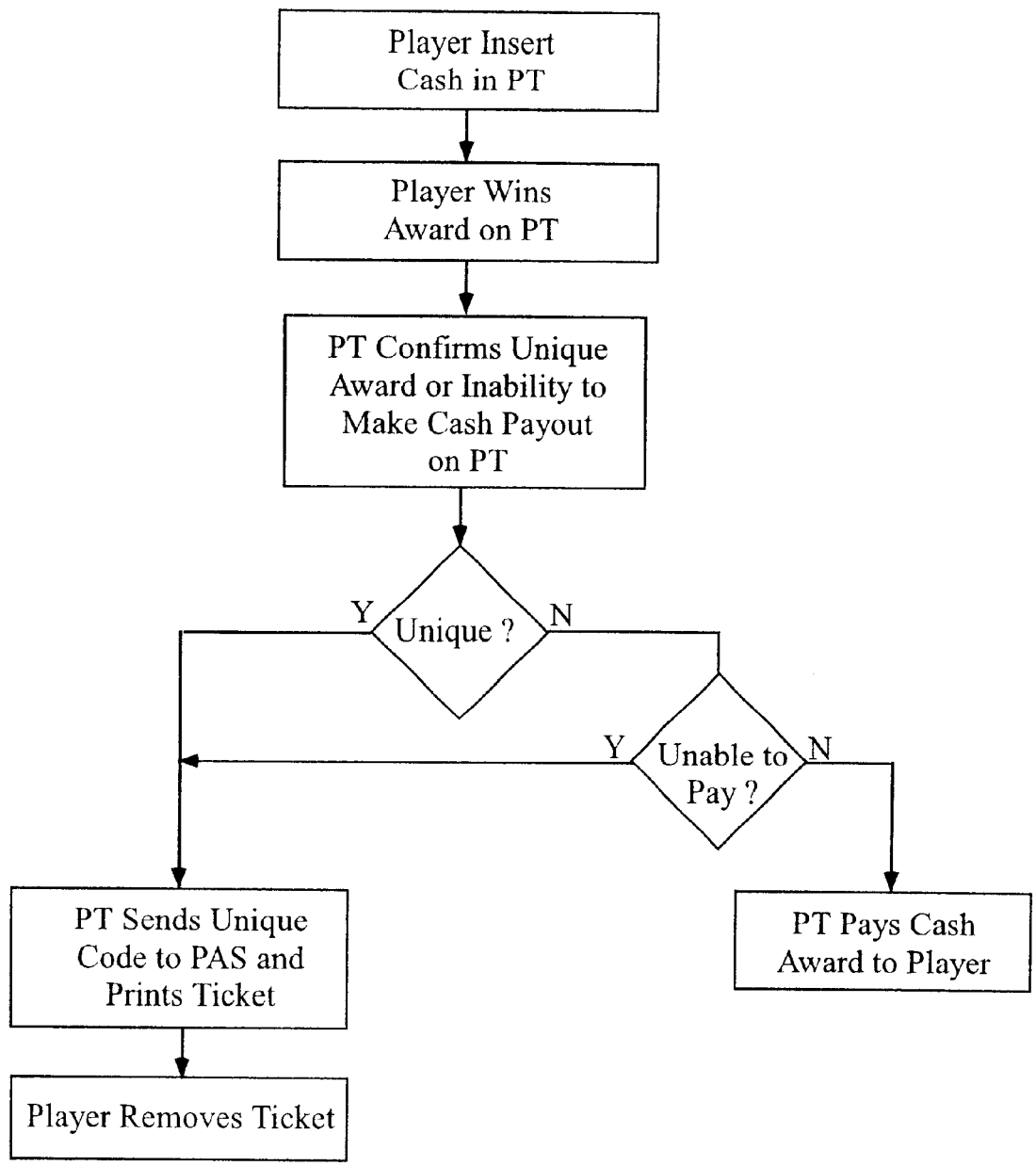
FIG. 12 is a flow chart showing an alternative use of a game of chance in the preferred method and apparatus to provide additional tickets or vouchers to players when a cash award exceeds a certain level, a particular product or service is awarded, or the player terminal ("PT") fails to provide cash output, when expected to do so, due to, for example, lack of sufficient cash in the PT to dispense the cash to the player at the PT.

Referring now to FIG. 12, the PT alternatively provides cash awards of certain types and product or service awards based on certain predetermined or random outcomes on the PT. For example, the PT is alternatively programmed to dispense cash only up to a certain ceiling, and thereafter, pay all or a portion of such level-exceeding awards by issuance of an updated voucher or ticket to the player at the PT.

Alternatively, or in addition, the PT may be programmed to provide awards of a service or product, rather than cash, upon the occurrence of certain outcomes at the PT. In this event, the preferred PT may report such service or Product outcome on an updated voucher issued to the player.

As noted above, the PT reports such outcomes and additional vouchers to the PAS. The PAS then records and stores the information reported on such additional vouchers so that the player may procure the proper award reflected in such additional vouchers from the cashier at the CT.

Alternatively, or in addition, the PT, if adapted to provide cash or other awards directly to the player from the PT or associated dispensing structure, may be programmed to determine when the PT or other dispensing structure has failed or is unable to dispense dispense the appropriate award to the player. In such event, the PT preferably reports the failure to the PAS and issues a suitable voucher or ticket to the player so that the player may then redeem the voucher for the proper award at the CT or MCT, if present in the network.

This voucher printing mechanism thus serves as a fail safe mechanism to ensure that the player procures the proper award with minimal if any frustration. This in turn enhances the player's overall gaming experience and the likelihood that the player will continue playing the game or return to the establishment to play games of chance at a later time or date.

Figure 13:
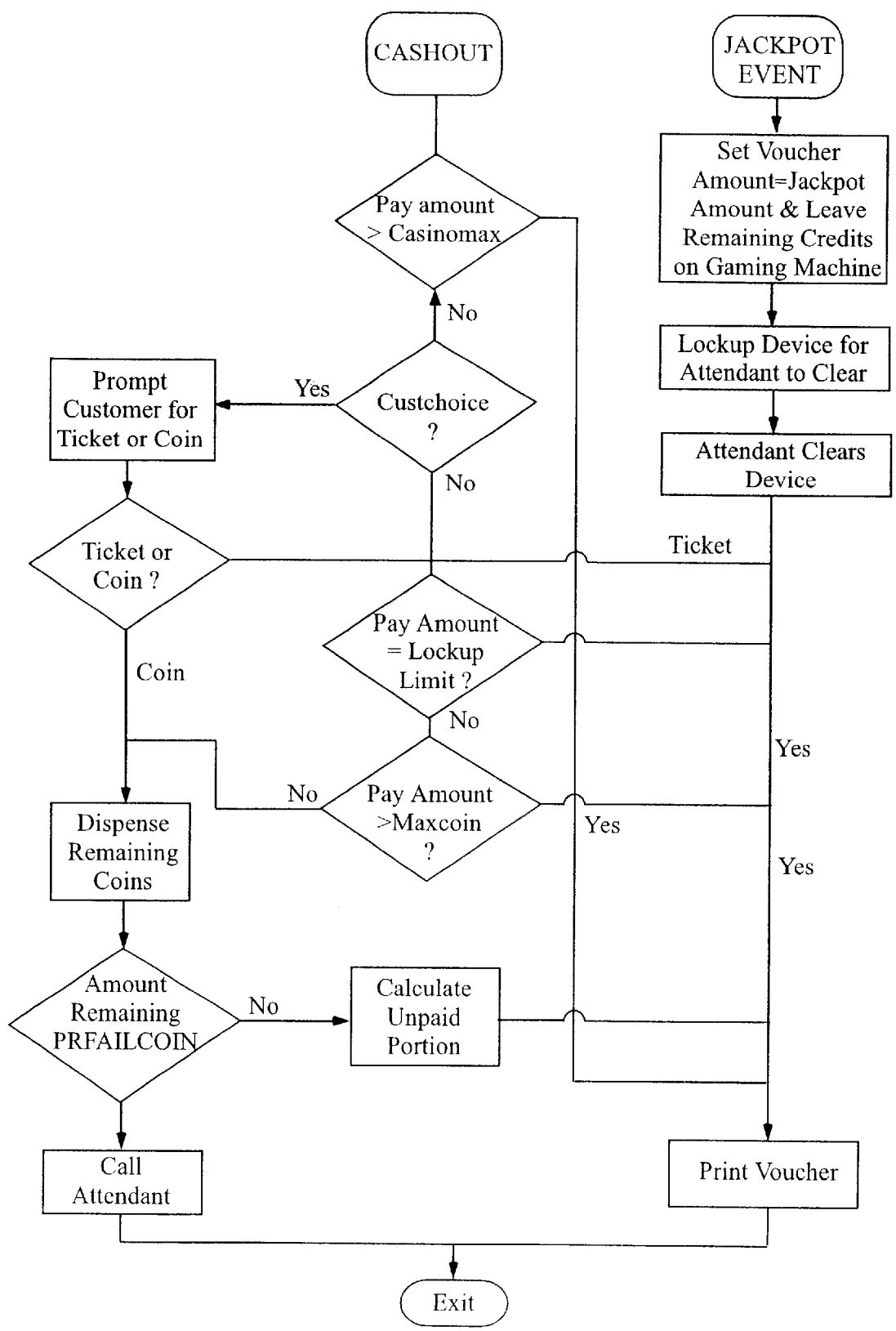
FIG. 13 is a flow chart showing the preferred method of having a given gaming terminal ("PT") on the network pay the player either by cash or by voucher.

Alternatively or in addition, the PT may also include both a cash hopper and voucher printer and also be programmed, as shown in FIG. 13, to allow the player to elect between receipt of cash or a printed voucher reflecting the amount of an award or credit balance on the PT. The nomenclature for the program of FIG. 13 is as follows:

PAYAMOUNT—Player or customer credits to be paid.
JPVALUE—Individual prize wins over this amount will be paid by voucher.
PRFAILCOIN—If printer fails, then pay up to this may be made by coin.
CUSTCHOICE—Provides the option to operator to allow customer to choose ticket or coin payment
LOCKUP LIMIT—Value at which machine will "lock up," requiring attendant, e.g., cashier at CT, to make prize payment to the player.
MAXCOIN—Maximum size payment that can be made in coins at the PT.

As explained above, the method and apparatus of the present invention may include a mobile CT apparatus ("MCT") mounted on the LAN and connected to the PAS through the HUB shown in FIG. 1. One such mobile cashier terminal is manufactured and sold by Sierra Design Group, Reno, Nev. This mobile terminal consists of a unitary cart assembly and mounted within it: a voucher printer assembly (Transact Technology, of Wallingford, Conn., Series 700 Thermal Printer), a cash drawer with till, a spare till, a bar code scanner assembly with base (Metrologic Model MS 6720), CPU with touch-screen display (Javelin Model JAV-LGUPW D32 WIN), power supply, 12V batteries, wireless LAN module with power supply (Airnet Remote), UPS without battery but with inverter to invert the 12V DC power from the batteries into 120V AC power for the other components on the cart, six-outlet power strip, and battery charger. The mobile terminal also utilizes a radio link, such as an Airnet Base Station and Remote. When used in the present apparatus and method, the Airnet Base Station is mounted on the LAN to perform wireless communications with the Airnet Remote mounted on the mobile terminal in a fashion well known to those skilled in the art.

It is to be understood that the foregoing is a detailed description of the preferred embodiment and various alternatives and options in connection with the present invention and the preferred embodiment. The scope of the invention, however, is to be determined by reference to the following claims.

What is claimed is:

1. A method for using a voucher in a gaming system having at least a terminal device configured to allow a player to play a game whose outcome is at least partially dependent on a random event, networked with a computer having a database configured to retrievably store individual voucher information using a unique transaction number, the method comprising:
   (a) receiving an indication from a player to issue a voucher at said terminal device;
   (b) generating a unique transaction number by said terminal device;
   (c) determining if said indication from said player was for taking unused credit from said terminal device or for prize redemption;
   (d) issuing a voucher having thereon said unique transaction number in machine readable form and further having thereon an indicator of a value for said voucher, said indicator of value corresponding to said credit on said terminal device if said player indication was for unused credit and being information associated with said unique transaction number;
   (e) issuing a voucher having thereon said unique transaction number in machine readable form and further having thereon an indicator for prize redemption comprising one of a selected prize or prize value, said indicator of prize redemption corresponding to a prize or prize value awarded on said terminal device if said player indication was for prize redemption and being information associated with said unique transaction number;
   (f) sending to said database said unique transaction number and associated information;
   (g) storing said unique transaction number and associated information in a manner retrievable using said unique transaction number, and further retrievable without the use of player-specific information; and,
   (h) re-sending said unique transaction number and said associated information for said issued voucher at a later time and then continuing to (g), if said database is currently not reachable.

2. The method of claim 1 where said terminal device having credit is a player terminal.

3. The method of claim 1 where said at least one terminal device further comprises a plurality of terminal devices and further comprises at least one cashier terminal, said cashier terminal being the terminal device having credit.

4. The method of claim 1 where said at least one terminal device further comprises a plurality of terminal devices and further comprises at least one prize redemption station usable for use with said issued voucher having said indicator of prize redemption.

5. The method of claim 1 where said at least one terminal device further comprises a plurality of terminal devices and further comprises at least one cash exchange terminal, said cash exchange terminal being the terminal device having credit.

6. The method of claim 1 where both (d) and (e) further comprise issuing a voucher where at least a portion of the machine readable form is encrypted.

7. The method of claim 4 where said prize redemption station is further configured to issue a prize directly to a player upon presentation of said voucher.

8. The method of claim 7 where said prize station is part of at least one game player terminal, said game player terminal configured to allow a player to play a game whose outcome is at least partially dependent on a random event.

9. The method of claim 1 where (b) further comprises: generating a unique transaction number using at least random numbers from a random number generator and a terminal device identifier associated with said terminal device.

10. The method of claim 1 where (b) further comprises: generating a unique transaction number using at least date, time, and a terminal device identifier associated with said terminal device.

11. A method for using a voucher in a gaming system having a terminal device configured to allow a player to play a game whose outcome is at least partially dependent on a random event, the terminal also configured to generate transaction numbers, networked with a computer having a database configured to retrievably store associated individual voucher information using a unique transaction number, the method comprising:
  (a) receiving a voucher on a terminal device;
  (b) extracting from said voucher a transaction number and associated voucher information from said received voucher by said terminal device;
  (c) sending to said database at least said transaction number;
  (d) making available to a player one of game credits or prizes, in accordance said associated voucher information;
  (e) receiving a confirmation from said database that said unique transaction number and associated information are validated where said unique transaction number and associated information have been retrieved using said unique transaction number and not using any player-specific information;
  (f) re-sending at least said unique transaction number at a later time, if said database is currently not reachable; and,
  (g) repeating (f) until receiving a confirmation from said database that said unique transaction number has been received by said database.

12. The method of claim 11 where said terminal device receiving a voucher is a player terminal and (d) further comprises making game credit available on said player terminal in an amount corresponding to said indicator of value.

13. The method of claim 11 where said terminal device receiving a voucher is one of: a cashier terminal; a mobile cashier terminal; or, a cash exchange terminal and (d) further comprises making cash available to a player in an amount corresponding to said indicator of value.

14. The method of claim 11 where said terminal device receiving a voucher is one of: a prize redemption station or a game terminal enabled for issuing prizes and (d) further comprises making prizes available to a player having a value in accordance with said associated information.

15. A gaming system comprising:
  a computer having a database operably disposed therein, said database configured to retrievably store individual voucher data using a unique transaction number and further configured such that each unique transaction number and associated data is retrievable without using player-specific information;
  a plurality of terminal devices where at least one terminal device is configured to allow a player to play a game whose outcome is at least partially dependent on a random event;
  a network connecting said computer having said database and said plurality of terminal devices;
  a terminal device identifier in each of said terminal devices, configured to be usable to generate unique transaction IDs;
  a voucher device operably disposed in each of said terminal devices, configured to read and write vouchers;
  a program operably disposed within each of said terminal devices, said program comprising code that is configured to generate unique transaction numbers using said terminal device identifier, associate one unique transaction number with data usable to issue a voucher, issue a voucher using said voucher device having thereon said associated unique transaction number and data, and to send and re-send said associated unique transaction number and data until a confirmation is received from said database.

16. The gaming system of claim 15 where said program in each of said terminal devices is further configured to generate unique transaction numbers using said terminal device identifier and a random number from a random number generator.

17. The gaming system of claim 15 where said program in each of said terminal devices is further configured to generate unique transaction numbers using said terminal device identifier and at least a date and time.

18. A system for using a voucher in a gaming system, the system having at least a terminal device configured to allow a player to play a game whose outcome is at least partially dependent on a random event, networked with a computer having a database configured to retrievably store individual voucher information using a unique transaction number, the system comprising:
  means for a player to request a voucher at said terminal device;
  means for said request to include an indicator if said request is for either one of taking unused game credits off of said terminal device, or, for prize redemption;
  means for said terminal device to generate a unique transaction number;
  means for issuing a voucher having thereon said unique transaction number in machine readable form and further having thereon an indicator of a value for said voucher, said indicator of value corresponding to said game credits on said terminal device if said player indication was for unused game credits, said indicator of value further being information associated with said unique transaction number;

means for issuing a voucher having thereon said unique transaction number in machine readable form and further having thereon an indicator for prize redemption comprising one of a selected prize or a prize value, said indicator of prize redemption corresponding to a prize or prize value awarded on said terminal device if said player indication was for prize redemption, said indicator of prize redemption associated with said unique transaction number;

means for sending to said database said unique transaction number and associated information;

means for storing said unique transaction number and associated information in a manner retrievable using said unique transaction number and further retrievable without using player-specific information; and, means for re-sending said unique transaction number and said associated information for said issued voucher at a later time if said database is currently not reachable.

19. The system of claim 18 where said at least one terminal device further comprises a plurality of terminal devices and further comprises at least one cashier terminal, said cashier terminal being is a terminal device having credit.

20. The system of claim 18 where said at least one terminal device further comprises a plurality of terminal devices and further comprises at least one prize redemption station usable for use with a voucher having an indicator of prize redemption.

21. The system of claim 18 where said at least one terminal device further comprises a plurality of terminal devices and further comprises at least one cash exchange terminal, said cash exchange terminal being a terminal device having credit.

22. The system of claim 18 where means for issuing a voucher further comprises means for issuing a voucher where at least a portion of the machine readable form is encrypted.

23. The system of claim 20 where said prize redemption station is further configured to issue a prize directly to a player upon presentation of said voucher.

24. The system of claim 23 where said prize station is physically contiguous with at least one game player terminal, said game player terminal configured to allow, a player to play a game whose outcome is at least partially dependent on a random event.

25. The system of claim 18 where said means for generating a unique transaction number further comprises means for generating a unique transaction number using at least random numbers from a random number generator and a terminal device identifier associated with said terminal device.

26. The system of claim 18 where said means for generating a unique transaction number further comprises means for generating a unique transaction number using at least date, time, and a terminal device identifier associated with said terminal device.

* * * * *